United States Patent [19]

Hatano et al.

[11] Patent Number: 4,539,662

[45] Date of Patent: Sep. 3, 1985

[54] METHOD AND SYSTEM FOR OPTICALLY RECORDING AND PLAYING BACK INFORMATION ON A RECORDING MEDIUM HAVING MAGNETIZATION FILM THEREON

[75] Inventors: Hideki Hatano; Norikiyo Tajiri; Sakashi Otaki; Shigeru Kato, all of Tokorozawa, Japan

[73] Assignee: Pioneer Electronic Corporation, Tokyo, Japan

[21] Appl. No.: 384,243

[22] Filed: Jun. 2, 1982

[30] Foreign Application Priority Data

Jun. 4, 1981 [JP] Japan .................................. 56-086152

[51] Int. Cl.$^3$ ............................................. G11B 11/10
[52] U.S. Cl. ........................................ 369/13; 360/59; 360/114; 369/45; 369/46
[58] Field of Search ............................. 369/13, 32–33, 369/44–46, 100, 110–111; 360/114, 59, 77–78; 365/121–122

[56] References Cited

U.S. PATENT DOCUMENTS

| | | |
|---|---|---|
| 3,715,740 | 2/1973 | Schmit . |
| 3,731,290 | 5/1973 | Aagard . |
| 3,905,040 | 9/1975 | Otala ..................................... 360/59 |
| 3,969,576 | 7/1976 | Boonstra et al. . |
| 4,085,423 | 4/1978 | Tsunoda et al. . |
| 4,275,275 | 6/1981 | Bricot et al. . |
| 4,290,122 | 9/1981 | Bates et al. . |
| 4,403,318 | 9/1983 | Nagashima et al. . |

FOREIGN PATENT DOCUMENTS

| | | | |
|---|---|---|---|
| 2652790 | 6/1977 | Fed. Rep. of Germany . | |
| 53-148913 | 12/1978 | Japan | 369/13 |
| 56-61054 | 5/1981 | Japan | 369/13 |
| 56-137538 | 10/1981 | Japan | 369/13 |

OTHER PUBLICATIONS

Imamura et al., "Experimental Study on Magneto-Optical Disk Exerciser with the Laser Diode and Amorphous Magnetic Thin Films", Japanese Journal of Applied Physics, vol. 19, No. 12, pp. L731–L734, 12/80.

Primary Examiner—Raymond F. Cardillo, Jr.
Attorney, Agent, or Firm—Fleit, Jacobson, Cohn & Price

[57] ABSTRACT

Disclosed is a method and system for recording and playing back information utilizing a recording medium having a vertical magnetization film on and from which the information is recorded and read out by an optical means, characterized by changing the direction of the magnetic field applied on the recording medium during the application of a recording light beam so as to maintain the recording track of portions of the recording medium on which the previously recorded information is erased by the application of the recording light beam during editing operations.

6 Claims, 6 Drawing Figures

→ DIRECTION OF THE MOVEMENT OF TRACK

METHOD AND SYSTEM FOR OPTICALLY RECORDING AND PLAYING BACK INFORMATION ON A RECORDING MEDIUM HAVING MAGNETIZATION FILM THEREON

BACKGROUND OF THE INVENTION

1. Field of the Invention

The present invention relates to a method and a system for recording and playing back information, and more particularly to a method and a system which utilizes a recording medium having a vertical magnetization film on and from which the information is recorded, and which has a readout mechanism utilizing optical means.

2. Description of the Prior Art

In recent years, recording systems have been proposed wherein information is recorded and played back by utilizing the magneto-optical characteristics of materials such as an amorphous (noncrystalline) alloy used as the recording medium. The amorphous alloy thin films such as Gadlinium Iron (GdFe) and Gadlinium Cobalt (GdCo) are examples of the "vertical magnetization films" in which the direction of magnetization is perpendicular to the surface of the film.

Recording of information on the amorphous thin film takes place in a manner such that the orientation or the direction of magnetization of the desired portions of the amorphous alloy film, which is initially magnetized in a preselected direction, is turned over by heating those portions above the Curie temperature or a compensation temperature while applying a weak external magnetic field.

More specifically, the amorphous alloy thin film which was previously downwardly (corresponding to the binary "0" signal) magnetized is subjected to a weak upwardly biased magnetic field, while only those portions of the thin film on which the "1" signal is to be recorded are applied with a laser beam so as to raise the temperature of those portions above the Curie temperature or a compensation temperature, thereby causing a change in the direction of magnetization.

On the other hand, the read out of information recorded on the thin film takes place by utilizing the magnetic Kerr effect, which is an interaction between the magnetization of substance and a light beam. When a linearly polarized laser beam is reflected by the magnetized thin film, the plane of polarization is rotated in a direction which is determined by the direction of the magnetization. Therefore, the information recorded on the amorphous thin film is read out by detecting the direction of rotation of the plane of polarization of the reflected laser beam by means of an analyzer.

Since this recording medium has the advantage that new information can be rewritten at will, referred to as "reversible recording", so called "editing" of the recorded information becomes possible. In editing, the reading out of the previously recorded information and the erasure of the unnecessary portion of the recording track and rewriting of new information, are usually performed in parallel.

However, the prior art systems of this type have suffered from the problem that certain portions of the recording track are completely erased during editing, which may cause difficulty in tracking the recording beam spot during the recording of new information. That is, there may be a shift in registry between the originally recorded and the newly-recorded information.

In such a case, the discrepancy, or lack of registry, between the newly recorded track and the pre-recorded track results in tracking problems during playback.

SUMMARY OF THE INVENTION

An object of the present invention is therefore to provide a method and a system for recording and playing back information in which the above-mentioned problem is eliminated.

According to the present invention, the method for recording and playing back information comprises the step of recording the information on a vertical magnetization film in a manner such that a spot of the recording light beam is applied, in accordance with the information to be recorded on a vertical magnetization film having a first uniform magnetization orientation, under the application of a weak magnetic field having a second and reverse magnetization orientation. Then, if it is desired subsequently to erase a portion of the recorded track, the recording light beam is applied on the desired portion of the recording track to be erased, under the application of a weak magnetic field having the same orientation as was used during the original recording step. This is done in a manner such that the desired portion of the recording track is erased subsequent to the reproduction (play back) of the recorded information, so that tracking and focusing are made possible.

The result of erasing by using a magnetic field of the same polarity as originally used for the recording step is that the integrity of the recording track is maintained. Because the entire disc originally was biased on a first magnetic direction and the recorded information oriented in a second and opposite direction, erasure in the second direction "stands out" on the disc having the vast majority of its bias in the first direction. Hence, the continuity of the recording track is maintained, thus facilitating the tracking step during rerecording and the application of new information in alignment with such track. In this regard, it should be noted that automatic alignment and focusing are contemplated in the inventive system, and attention is directed to copending U.S. application, entitled "Information Recording System" and filed by the same Applicant, Ser. No. 384,241, now copending, filed on June 2, 1984.

The step of recording the new information is done in a manner such that a recording beam corresponding to the new information is applied on the recording track which resulted from the erasure, under the application of a magnetic field having a direction reverse from that used in the erasure.

The foregoing and other objects and advantages of the invention will become more clearly understood from the following description taken in conjunction with the accompanying drawings.

DETAILED DESCRIPTION OF THE PREFERRED EMBODIMENT

Figure 1:
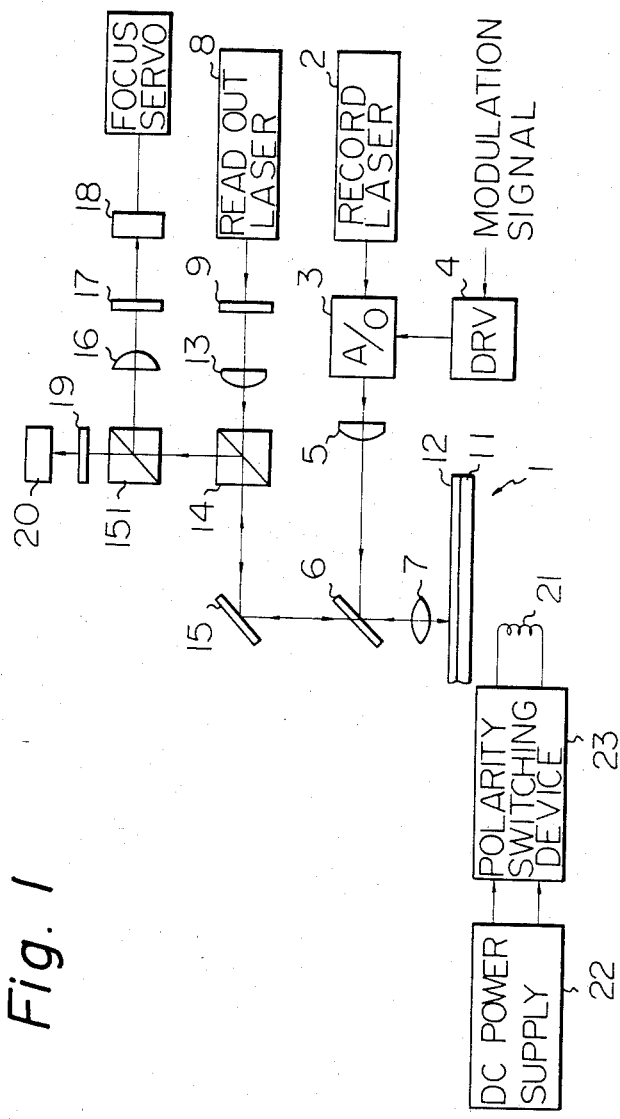
FIG. 1 is a schematic block diagram of an embodiment of the present invention.

Reference is first made to FIG. 1, wherein an embodiment of the recording and playback system according to the present invention is illustrated.

In FIG. 1, there is shown a disc 1 comprising a base 11 of a dielectric material such as glass, and an amorphous thin film 12 formed thereon. The amorphous thin film 12 is made of Gadlinium Iron (GdFe) or Gadlinium Cobalt (GdCo), for example.

An output light beam of a laser source 2 is fed to an A/O (Acoustic Optical) modulator 3 where the light beam is modulated by an output signal of a driver 4 which receives a signal corresponding to the informaiton to be recorded. The modulation signal, i.e., the output signal of the driver 4, takes the form of a digital pulse signal produced by modulating the frequency of a carrier signal having a predetermined frequency by the signal to be recorded, and by limiting the amplitude of the signal by means of a limiter circuit.

The output beam of the A/O modulator 3 takes the form of a pulse train of light corresponding to the pulse signal from the driver 4, and passes throught a lens 5 and a dichroic mirror 6. The beam thus is formed into a recording beam spot, and is focused on the recording surface 12 of the disc 1 by means of a focus lens 7.

The system is also provided with a readout laser source 8, the output beam of which has a frequency different from that of the recording laser beam from source 2. The readout laser beam is also introduced to the focus lens 7, through a diffraction grating 9, a lens 13, a half prism 14, and a mirror 15, and forms a readout beam spot which is focused on the recording surface 12 of the disc 1.

The reflection of the readout laser beam travels the same path as does the incidental beam, until it is received by the half prism 14 at which time the reflection beam is directed to a half prism 151. Half prism 151 splits the reflection beam received form half prism 14 into a first beam directed to a first light detector 18 through a cylindrical lens 16 and a first analyzer 17, and a second beam directed to a second light detector 20 through a second analyzer 19.

If the first and second analyzers 17 and 19 are arranged appropriately, a playback RF signal having a good S/N ratio can be produced by means of a differentiation amplifier (not shown) which receives the output signals of the first and second light detectors 18 and 20, wherein noises inherent to the laser beam can be sufficiently cancelled.

In addition, the output signal of the first light detector 18 is utilized to control a so called "focus servo" system in which the distance between the focus lens 7 and the recording surface 12 of the disc is controlled to maintain the beam from the focus lens 7 in focus on the recording surface 12.

A coil 21 for generating a bias magnetic field is disposed directly beneath the portion of the disc 1 at which the recording laser beam is focused, and is fed with a DC voltage from a DC voltage source 22 via a polarity switching device 23.

Figure 2:
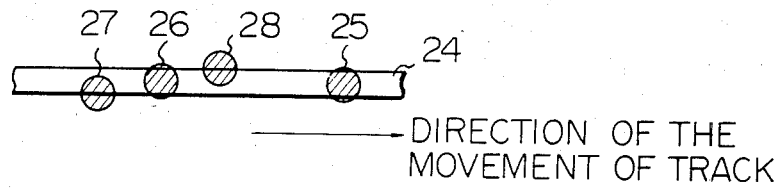
FIG. 2 is a schematic top view of a recording track showing the relationship between the beam spot and the recording track.

In FIG. 2, there is illustrated the relationship between the recording track and a plurality of beam spots used in the system.

For purposes of explanation, let it be assumed that the recording track (or the recording portion of the disc) moves in the direction indicated by the arrow shown in the figure. A recording beam spot 25 shown at the right hand portion of the figure has its center at the central portion of the recording track 24. A playback beam spot 26 is also indicated with its center at the central portion of the recording track 24.

A pair of spots 27 and 28, positioned at both sides of the playback beam spot 26, are utilized for the tracking purpose and a first order light beam from the diffraction grating 17 is utilized for these tracking beam spots 27 and 28. On the other hand, a zero order output light beam from the diffraction grating 17 is utilized for the playback beam spot 26.

As shown, these beam spots 26 to 28 are so arranged that beam spots 27 and 28 are positioned at the peripheral portion of the recording track when the playback beam spot 26 is located at the center of the recording track 24. Therefore, the tracking error of the playback beam spot 26 can be detected by means of the difference in intensities between the reflections of the tracking beams 27 and 28. The thus obtained tracking error signal is used to effect operation of the tracking servo system.

Taking account the above described arrangement of the recording beam spot, playback beam spot, and tracking beam spots, the recording and playback method according to the present invention will now be described with reference to FIGS. 3A to 3D.

Figure 3:
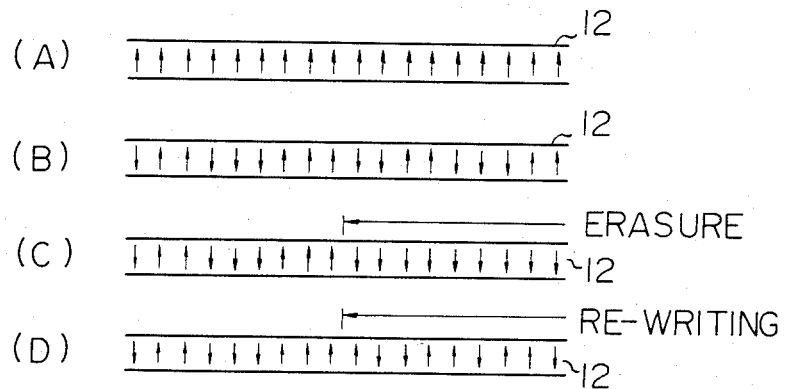
FIGS. 3A to 3D are schematic illustrations of the vertical magnetization film, showing the magnetization directions in various steps of recording.

Reference is first made to FIG. 3A, where there is illustrated the magnetization direction of the recording film at the initial state (before any recording) wherein the magnetization direction is unified in the upward direction.

At the time of recording information on this recording film, the direction of the weak magnetic field produced by the coil 21 is controlled by means of the polarity switching device 23 so that the magnetic field is directed in the downward direction. In accordance with the signal applied to the driver 4, the recording laser beam is controlled to turn on and off, thereby changing the localized direction of magnetization of the recording film in a manner such that only the portions of the recording film on which the recording laser beam is applied becomes downwardly magnetized as shown in FIG. 3B. At the time of the recording operation, the disc is translated along its radial direction at a constant speed, so that the recording tracks are spaced at constant intervals.

During the recording operation, the focus servo system is controlled in accordance with the output signal of the light detector 18, which receives the reflected beam of the playback beam spot 26, so that the recording beam spot 25 is accurately focused on the recording film 12. This focusing is described in detail in the aforementioned copending application.

Then, when it is desired to erase some of the information recorded on the recording track, the source 8 of the playback laser beam is actuated to playback (monitor) the recorded information and simultaneously to operate the tracking servo system and the focus servo system. When the portion of the recording track bearing the unnecessary information reaches the position of the recording beam spot in accordance with the movement of the disc 1, the source 2 of the recording laser beam is actuated in accordance with an erasure command signal.

Since the direction of the magnetic field of the coil 21 is the same as the magnetization direction used during the original recording operation, the magnetization direction of the erased portion is inverse to the magnetization direction of the original unrecorded disc, shown in FIGS. 3A and 3C. Therefore, position of the recording track can be readily detected, so that with the tracking operation enabled during the recording of new information, it is ensured that there is continuity between the recording tracks of the old and new information.

It is necessary to change the direction of the magnetic field at the time of recording new information on the erased portion, and since the magnetization of the erased portion has a downward direction, the magnetic field is directed upwardly at the time of recording new information.

FIG. 3D shows an example of the recording track on which the new information is recorded on the previously erased portion of the recording track. As noted above, the continuity of recording tracks of old and new information is maintained because the tracking servo and focus servo systems are operated during the recording of new information.

In order to change the direction of the magnetic field produced by the coil 21 during the rewriting of new information, it is sufficient to place a sign or a detectable pattern on the lead portion of the erased track, so that the sign or pattern is detected to operate the polarity switching device 23 at the time of rewriting.

It will be appreciated from the foregoing that a precise tracking is enabled in accordance with the present invention. By timing the playback beam spots so that they precede the recording beam spots (timed by controlling the light emission from laser sources 8 and 2, respectively), monitoring becomes possible during the erasure of the information, which ensures the continuity of recording track. Furthermore, this arrangement enables the detection of the sign or pattern recorded at the lead portion of the erased track at the time of rewriting new information.

Above, a preferred embodiment of the present invention has been described. It should be understood, however, that the foregoing description has been for illustrative purpose only, and is not intended to limit the scope of the invention. Rather, there are numerous equivalents to the preferred embodiments, and such are intended to be covered by the appended claims. As only one of many examples, the amorphous alloy used as the material of the thin film may be replaced by a polycrystalline material such as Manganese Bismuth (MnBi).

What is claimed is:

1. A method for recording, playing back and erasing information utilizing a recording medium having a vertical magnetization film on and from which the information is recorded and having readout by optical means, including a recording beam and a playback beam, means for applying a weak magnetic field on the recording medium, and a tracking servo system operated by a control signal produced by a reflection of the playback beam, the method comprising the steps of:

recording the information on the vertical magnetization film to form a recording track, in manner such that a spot of the recording beam is applied, in accordance with the information to be recorded, on the vertical mangetization film whose magnetization orientation is previously unified in a first direction, under the application of the weak magnetic field having a second direction reverse from said first direction;

reproducing the recorded information and erasing desired portions of the recorded information by applying the recording beam on desired portions of the recording track under the application of the weak magnetic field whose magnetic orientation is in said second direction; and operating the tracking servo at the time the erasing operation is performed so that the recording beam is applied in registry with the original said recording track, thereby erasing the desired portions of said recording track subsequent to the reproduction of the information recorded thereon, and forming new recording tracks accurately on the initial recording track by the operation of tracking servo system.

2. A method as claimed in claim 1, comprising the further step of recording new information on said recording track at the location formed by the erasure, by applying a magnetic field having a magnetic orientation in said first direction.

3. A method as claimed in claim 2, wherein the magnetic orientation is controlled by a polarity switching device responsive to a control signal produced by the tracking servo system, and wherein the erasure step further comprises the step of recording a predetermined sign for indicating a desired change of the magnetization direction at the lead portion of the erased region of the recording track, thereby automatically changing the direction of the magnetic field to said first direction at the time of recording new information.

4. A system for recording and playing back information utilizing a vertical magnetization film on and from which the information is recorded and read out, the system comprising:

a source of a recording light beam;

a modulator for modulating said recording light beam in accordance with a signal corresponding to the information to be recorded;

a first optical path for introducing said modulated recording light beam on the surface of the vertical magnetzation film;

a source of a playback light beam;

a second optical path for introducing said playback light beam on the surface of the vertical magnetization film;

a tracking servo mechanism responsive to a control signal produced by a reflection beam of said playback light beam, for controlling the position of a recording track formed on the vertical magnetization film by the application of said recording light beam;

means for applying a weak magnetic field on said vertical magnetization film whose magnetization direction is initially unified in a first direction, during the application of said recording light beam; and means for changing the direction of said magnetic field to a second and opposite direction during a first recording and subsequent erasure so that the portions of the vertical magnetization film receiving the recording light beam during the erasure of information form a recording track aligned with the first recording track with the operation of said tracing servo mechanism.

5. A system as claimed in claim 4, characterized in that said playback light beam introduced by said second optical path preceds said recording light beam introduced by said first optical path on the surface of said vertical magnetization film during the operation of the system, thereby enabling the operation of said tracking servo mechanism.

6. A system as claimed in claim 4, wherein said means for changing the direction of magnetic field operates to change the direction of the magnetic field during rewriting of information so that the magnetization direction of the portion of the vertical magnetization film on which new information is recorded is reverse from that of the portion on which the erasure was effected.

* * * * *